United States Patent
Miyazaki

(10) Patent No.: US 10,091,374 B2
(45) Date of Patent: Oct. 2, 2018

(54) IMAGE FORMING APPARATUS HAVING ABNORMALITY DETERMINATION FUNCTION

(71) Applicant: KYOCERA Document Solutions Inc., Osaka-shi, Osaka (JP)

(72) Inventor: Tadashi Miyazaki, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 0 days.

(21) Appl. No.: 15/710,586

(22) Filed: Sep. 20, 2017

(65) Prior Publication Data

US 2018/0084125 A1 Mar. 22, 2018

(30) Foreign Application Priority Data

Sep. 21, 2016 (JP) .................. 2016-184526

(51) Int. Cl.
| | | |
|---|---|---|
| *G03G 15/00* | (2006.01) | |
| *G03G 15/20* | (2006.01) | |
| *H04N 1/00* | (2006.01) | |

(52) U.S. Cl.
CPC ..... *H04N 1/00814* (2013.01); *G03G 15/2053* (2013.01); *G03G 15/5045* (2013.01);
(Continued)

(58) Field of Classification Search
CPC .......... G03G 15/2025; G03G 15/2039; G03G 15/205; G03G 15/2053; G03G 15/2075; G03G 15/2078; G03G 15/5004; G03G 15/5016; G03G 15/5045; G03G 15/6588; G03G 15/6591; G03G 15/6594; G03G 15/80; G03G 2215/00308; G03G 2215/00312; G03G 2215/00476; G03G 2215/00493; G03G 2215/00523; G03G 2215/00531; H04N 1/00814; H04N 1/00005
See application file for complete search history.

(56) References Cited

U.S. PATENT DOCUMENTS 6,173,131 B1 * 1/2001 Kitamura ........... G03G 15/2003
374/153
2010/0166446 A1 * 7/2010 Naganawa ......... G03G 15/2039
399/69
(Continued)

FOREIGN PATENT DOCUMENTS

JP 2009-042595 A 2/2009

*Primary Examiner* — Joseph S Wong
(74) *Attorney, Agent, or Firm* — Alleman Hall Creasman & Tuttle LLP

(57) ABSTRACT

In an image forming apparatus, a calculation processing portion includes an input portion and an input-portion abnormality determining portion. The input portion is connected to a temperature detection portion. When an abnormality detection circuit has detected that a temperature detected by the temperature detection portion is an abnormally heated temperature, the input-portion abnormality determining portion determines whether or not a first temperature calculated as a temperature of a fixing member is lower than a predetermined second temperature, and upon determining that the first temperature is lower than the second temperature, determines that the input portion is abnormal.

11 Claims, 9 Drawing Sheets

(52) U.S. Cl.
CPC ....... *G03G 15/205* (2013.01); *G03G 15/2025* (2013.01); *G03G 15/2039* (2013.01); *G03G 15/5004* (2013.01); *G03G 15/5016* (2013.01); *G03G 15/6588* (2013.01); *G03G 15/6591* (2013.01); *G03G 15/6594* (2013.01); *G03G 15/80* (2013.01); *G03G 2215/00308* (2013.01); *G03G 2215/00312* (2013.01); *G03G 2215/00476* (2013.01); *G03G 2215/00493* (2013.01); *G03G 2215/00523* (2013.01); *G03G 2215/00531* (2013.01); *H04N 1/00005* (2013.01)

(56) References Cited

U.S. PATENT DOCUMENTS

| | | | |
|---|---|---|---|
| 2012/0141150 A1* | 6/2012 | Noh | G03G 15/2039 399/33 |
| 2014/0044447 A1* | 2/2014 | Jeong | G03G 15/80 399/69 |
| 2017/0090361 A1* | 3/2017 | Kuwana | G03G 15/2053 |

* cited by examiner

IMAGE FORMING APPARATUS HAVING ABNORMALITY DETERMINATION FUNCTION

INCORPORATION BY REFERENCE

This application is based upon and claims the benefit of priority from the corresponding Japanese Patent Application No. 2016-184526 filed on Sep. 21, 2016, the entire contents of which are incorporated herein by reference.

BACKGROUND

The present disclosure relates to an image forming apparatus including a fixing member for fixing a toner image to a sheet.

Some image forming apparatuses such as printers include a safety circuit that forcibly stops power supply to a fixing heater when a fixing device is abnormally heated. There is known a temperature control device of this type of image forming apparatus that includes the safety circuit, such as a thermoswitch, that forcibly stops the power supply to the fixing heater, as well as a second safety circuit that maintains an off-state of the fixing heater upon detection of an abnormality of the CPU.

SUMMARY

An image forming apparatus according to an aspect of the present disclosure includes a fixing member, a fixing heater, a temperature detection portion, a driving circuit, an abnormality detection circuit, and a calculation processing portion. The fixing member fixes a toner image to a sheet. The fixing heater heats the fixing member. The temperature detection portion detects a temperature of the fixing member. The driving circuit drives the fixing heater based on the temperature detected by the temperature detection portion. The abnormality detection circuit is connected to the temperature detection portion and detects whether or not the temperature detected by the temperature detection portion is an abnormally heated temperature. The calculation processing portion includes an input portion and an input-portion abnormality determining portion. The input portion is connected to the temperature detection portion. The input-portion abnormality determining portion, when the abnormality detection circuit has detected that the temperature detected by the temperature detection portion is the abnormally heated temperature, determines whether or not a first temperature calculated as the temperature of the fixing member is lower than a predetermined second temperature, and upon determining that the first temperature is lower than the second temperature, determines that the input portion is abnormal.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes embodiments of the present disclosure with reference to the accompanying drawings for the understanding of the present disclosure. It should be noted that the following embodiments are examples of specific embodiments of the present disclosure and should not limit the technical scope of the present disclosure.

[First Embodiment]

Figure 1:
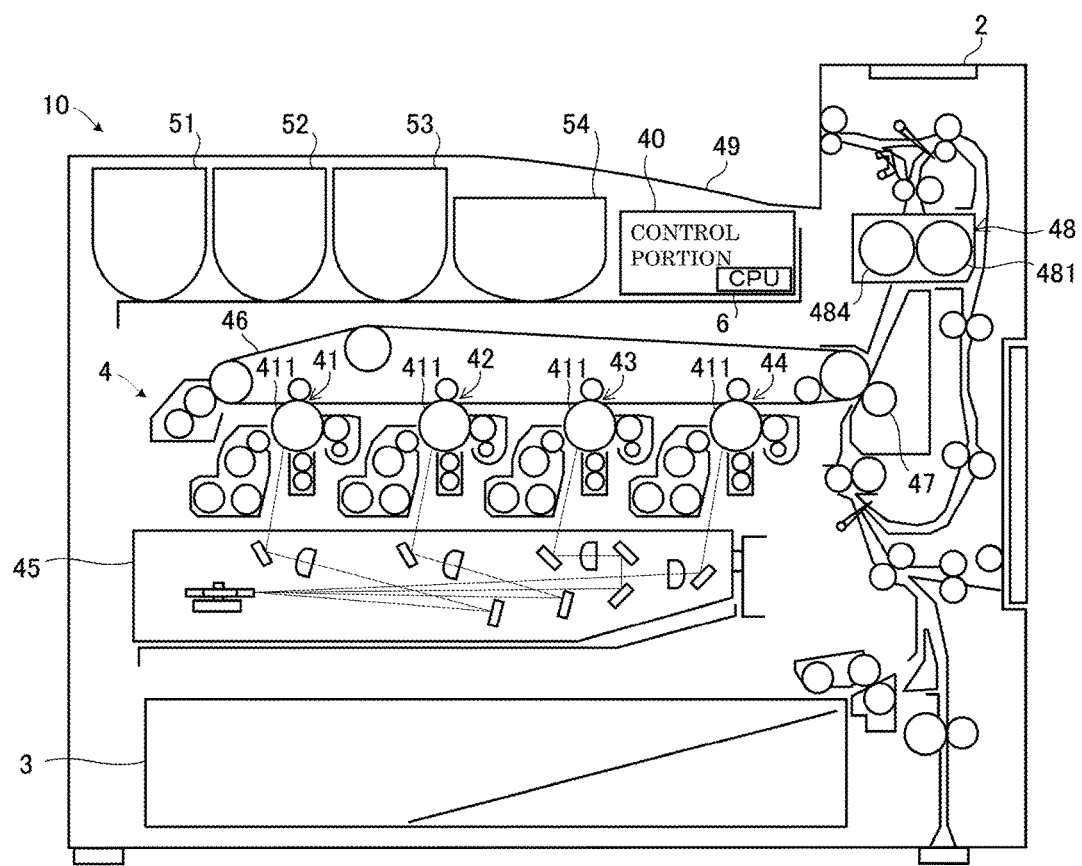
FIG. 1 is a sectional diagram showing a schematic configuration of an image forming apparatus according to a first embodiment of the present disclosure.
Figure 2:
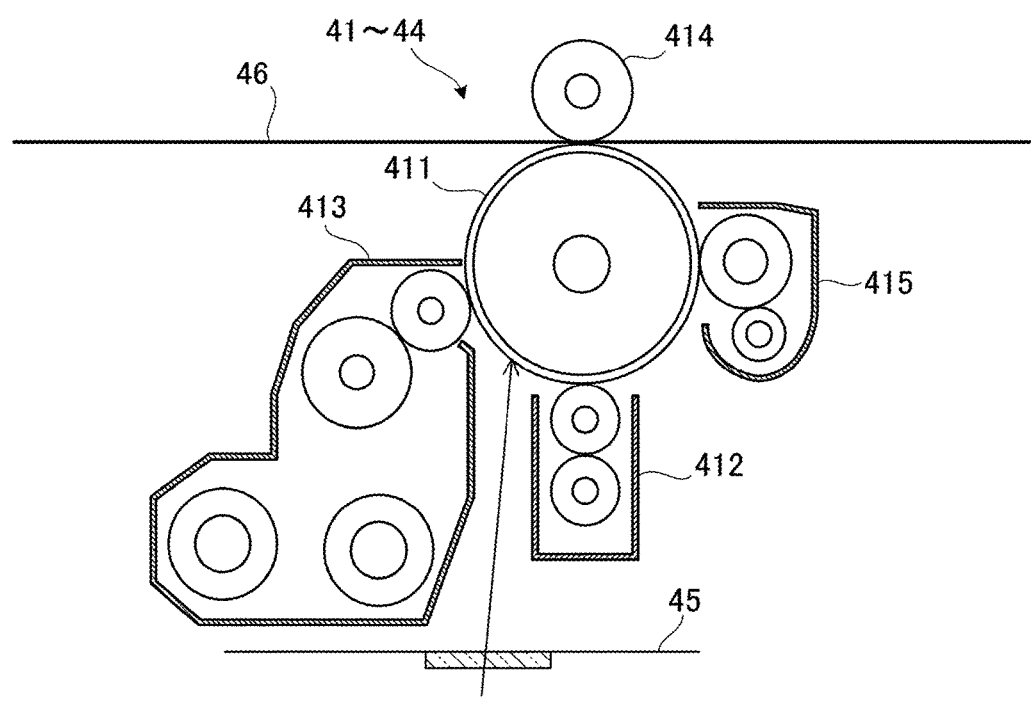
FIG. 2 is a sectional diagram showing a schematic configuration of an image forming unit of the image forming apparatus shown in FIG. 1.

First, a description is given of an outlined configuration of image forming apparatus 10 according to a first embodiment of the present disclosure, with reference to FIG. 1 and FIG. 2.

As shown in FIG. 1 and FIG. 2, the image forming apparatus 10 is a printer that includes an operation/display portion 2, a sheet feed cassette 3, and an image forming portion 4. It is noted that the image forming apparatus of the present disclosure may be a facsimile device, a copier, or a multifunction peripheral, for example.

The operation display portion 2 includes a display portion and an operation portion. The display portion is, for example, a liquid crystal display for displaying various types of information such as an error message. The operation portion is composed of, for example, hard keys or a touch panel through which various types of information are input in accordance with user operations.

The sheet feed cassette 3 stores sheets that are supplied to the image forming portion 4.

The image forming portion 4 forms a color or monochrome image on a sheet by an electrophotographic system, based on image data input from an external information processing apparatus such as a personal computer. Specifically, the image forming portion 4 includes an engine control portion 40, a plurality of image forming units 41 to 44, a laser scanning device (LSU) 45, an intermediate transfer belt 46, a secondary transfer roller 47, a fixing device 48, a sheet discharge tray 49, and toner containers 51 to 54.

The engine control portion 40 comprehensively controls the image forming portion 4. The engine control portion 40 is a computer that includes control equipment such as an engine CPU 6, a ROM, and a RAM.

The engine CPU 6 executes a control program by using the RAM or the like as a temporary storage memory (working area), wherein the control program is stored in the ROM in advance. The engine CPU 6 is an example of the calculation processing portion of the present disclosure. Other examples of the calculation processing portion of the present disclosure include a main CPU of a main control portion that comprehensively controls the image forming apparatus 10. It is noted that the engine CPU 6 is described in detail below.

The plurality of image forming units 41 to 44 include an image forming unit 41 corresponding to cyan, an image forming unit 42 corresponding to magenta, an image forming unit 43 corresponding to yellow, and an image forming unit 44 corresponding to black. Each of the image forming units 41 to 44 includes a photoconductor drum 411, a charging device 412, a developing device 413, a primary transfer roller 414, and a cleaning portion 415.

The laser scanning device 45 irradiates laser light to the photoconductor drums 411 based on image data so that electrostatic latent images are respectively formed on the photoconductor drums 411.

Figure 3:
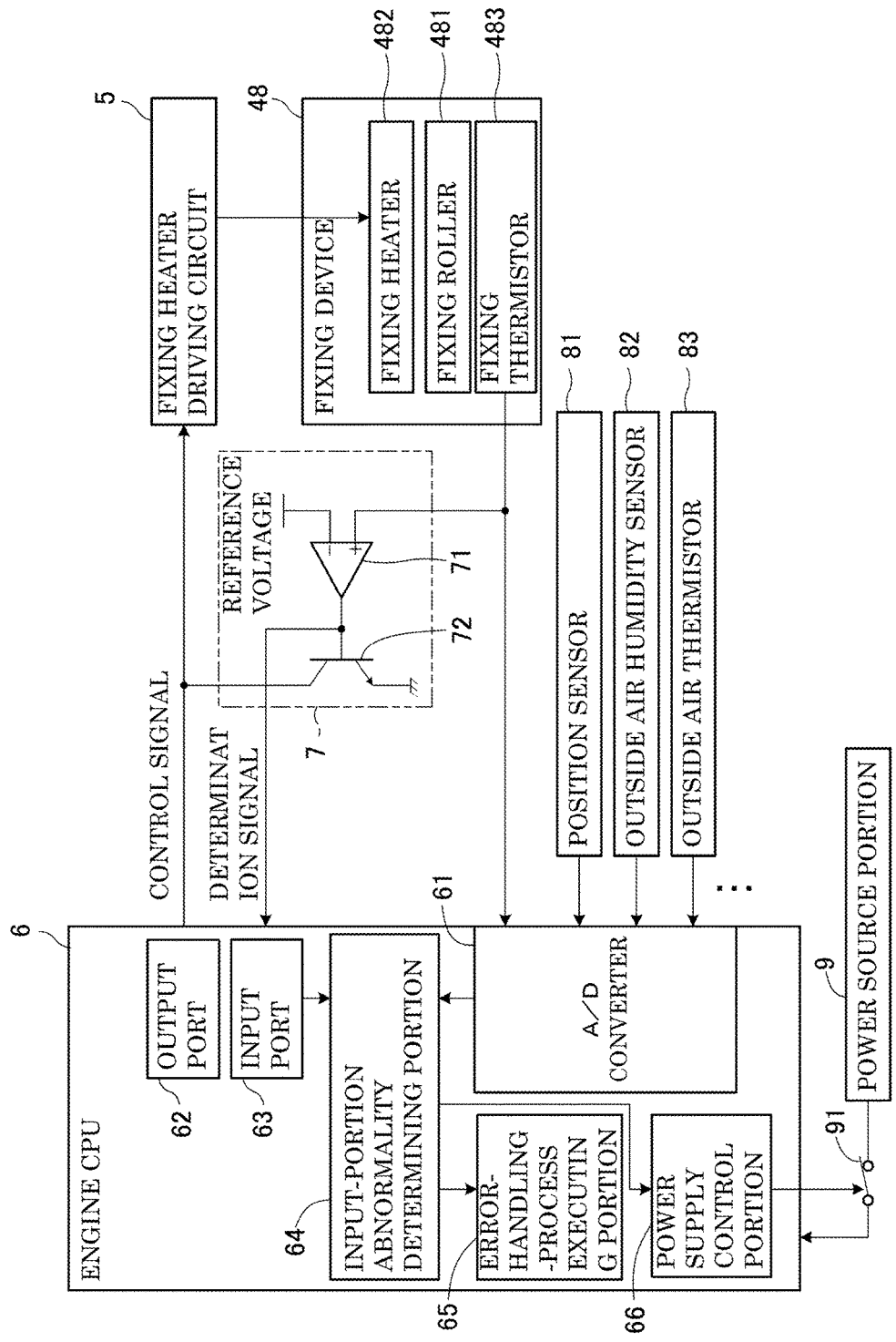
FIG. 3 is a block diagram showing a fixing device of the image forming apparatus shown in FIG. 1, as well as other components such as an engine CPU.

Here, FIG. 3 is a block diagram showing the fixing device 48 of the image forming apparatus 10 shown in FIG. 2 as well as other components such as the engine CPU 6.

As shown in FIG. 3, the fixing device 48 includes a fixing roller 481, a fixing heater 482, and a fixing thermistor 483.

Meanwhile, there may be a case where the image forming process is stopped upon detection of an abnormality of the engine CPU 6. The engine CPU 6 may recover easily from the abnormality if the main power source is turned off and on. However, in general, even in such a case, the image forming process would be stopped to waste time until the repair was done by a service engineer. For example, in a case where the image forming process is stopped after the engine CPU 6 detects an abnormality of the fixing device 48, restarting by turning off and on the main power source may or may not allow the apparatus to recover to a state where the image forming process can be executed. For example, in the case of an erroneous detection of an abnormality of the fixing device 48, restarting the image forming apparatus 10 by turning off and on the main power source may allow the apparatus to recover to a state where the image forming process can be executed. On the other hand, in a case where the fixing device 48 has been heated abnormally, restarting the apparatus may not allow the apparatus to recover to a state where the image forming process can be executed normally. At this time, for example, if restarting by turning off and on the main power source is prohibited after the engine CPU 6 detects an abnormally heated state of the fixing device 48, the image forming apparatus 10 is maintained to a state where it cannot be used even when the image forming apparatus 10 is actually in a state where the image forming process can be executed normally, as when an abnormality of an A/D converter 61, an input portion, described below is detected. In contrast, in the image forming apparatus 10 according to the present embodiment, when the fixing roller 481 is in an abnormally heated state, it is possible to determine whether or not it can recover easily from the abnormally heated state by turning off and on the main power source.

The fixing roller 481 heats a toner image that has been transferred to a sheet by the secondary transfer roller 47, and together with a pressure roller 484, fixes the toner image to the sheet (see FIG. 1). The fixing roller 481 is an example of the fixing member of the present disclosure.

The fixing heater 482 heats the fixing roller 481. As the fixing heater 482, a halogen lamp heater, a ceramic heater, or an inductive heater can be used, for example.

The fixing thermistor 483 detects the temperature of the fixing roller 481. The fixing thermistor 483 is an example of the temperature detection portion of the present disclosure.

In addition, in the fixing device 48, the fixing heater 482 is connected to a fixing heater driving circuit 5, and the fixing thermistor 483 is connected to the engine CPU 6. The fixing heater driving circuit 5 is controlled by a control signal from the engine CPU 6 of the engine control portion 40, and drives the fixing heater 482 based on the control signal. The fixing heater driving circuit 5 is an example of the driving circuit of the present disclosure.

The engine CPU 6 includes the A/D converter 61, an output port 62, and an input port 63. It is noted that the A/D converter 61 is used to input analog signals, and is an example of the input portion of the present disclosure. In addition, the output port 62 and the input port 63 are general-purpose ports that are used to output and input digital signals, respectively.

Figure 4:
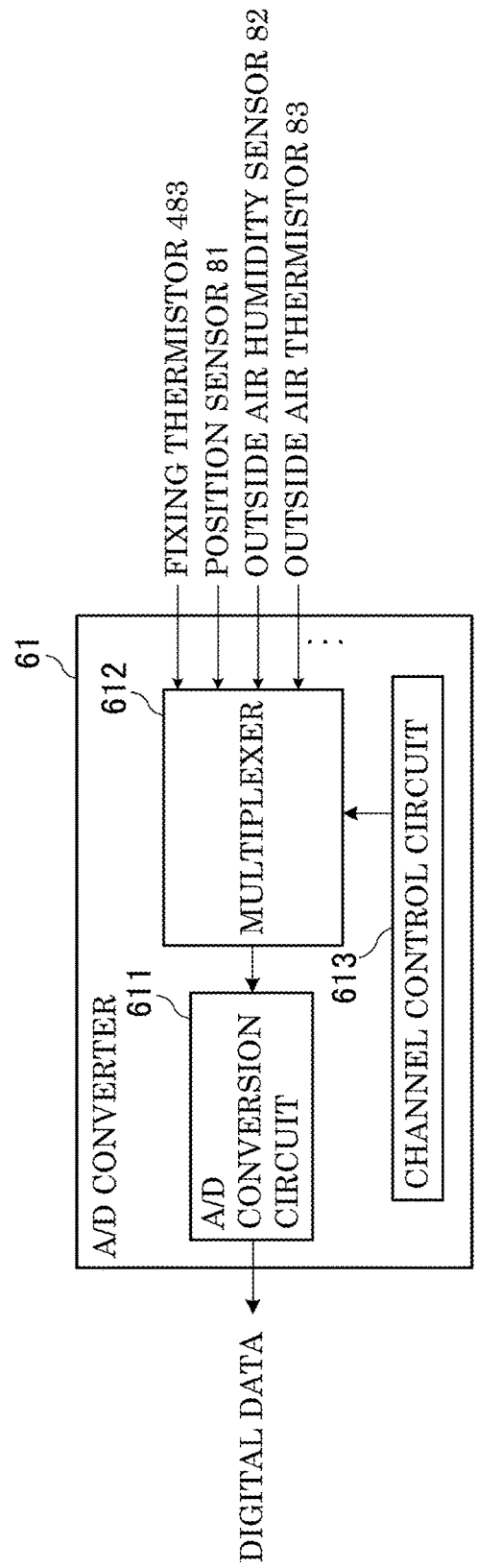
FIG. 4 is a block diagram showing a schematic configuration of an A/D converter of the engine CPU shown in FIG. 3.

As shown in FIG. 4, the A/D converter 61 includes an A/D conversion circuit 611, a multiplexer 612, and a channel control circuit 613.

The A/D conversion circuit 611 converts analog data input to the engine CPU 6, to digital data. The multiplexer 612 includes a plurality of input channels, and changes analog data input to the engine CPU 6 by sequentially changing an input channel that is effective for inputting analog data. The channel control circuit 613 controls the multiplexer 612 to change the input channel that is effective for inputting analog data, at predetermined intervals.

The plurality of input channels of the multiplexer 612 connect to the fixing thermistor 483, a position sensor 81, an outside air humidity sensor 82, and an outside air thermistor 83. It is noted that the outside air thermistor 83 is an example of the ambient-temperature detection portion of the present disclosure. In addition, among the plurality of input ports, an input channel connected to the fixing thermistor 483 corresponds to the first input channel of the present disclosure, and an input channel connected to the outside air thermistor 83 corresponds to the second input channel of the present disclosure. Hereinafter, the input channel connected to the fixing thermistor 483 is referred to as the first input channel, and the input channel connected to the outside air thermistor 83 is referred to as the second input channel.

Since the fixing thermistor 483 is connected to the multiplexer 612 of the A/D converter 61, the engine CPU 6 can monitor the temperature of the fixing roller 481. The temperature of the fixing roller 481 is calculated in synchronization with a timing at which input to the first input channel becomes effective. The engine CPU 6 generates a control signal to be transmitted to the fixing heater driving circuit 5, by comparing a temperature of the fixing roller 481 that is calculated based on an output from the fixing thermistor 483, with a control target temperature of the fixing roller 481. That is, the engine CPU 6 maintains the fixing roller 481 to the target temperature by transmitting the control signal to the fixing heater driving circuit 5. Hereinafter, the timing at which input to the first input channel becomes effective is referred to as a temperature monitoring timing.

As shown in FIG. 3, the output port 62 of the engine CPU 6 is connected to the fixing heater driving circuit 5. The output port 62 outputs the control signal that is generated based on an output from the fixing thermistor 483, to the fixing heater driving circuit 5. The control signal includes an ON signal (high-level signal) and an OFF signal (low-level signal), wherein the ON signal is output to drive the fixing heater 482, and the OFF signal is output to stop driving of the fixing heater 482. In the present embodiment, the ON signal (high-level signal) is a positive level, and the OFF signal (low-level signal) is a zero level. When the control signal is transmitted to the fixing heater driving circuit 5 via the output port 62, the driving of the fixing heater 482 is controlled, and the fixing roller 481 is maintained to the control target temperature. The control target temperature is determined based on, for example, the type of toner that is in use, and is in a range from 100° C. to 200° C. inclusive, for example.

The input port 63 of the engine CPU 6 is connected to an abnormality detection circuit 7, and receives a determination signal from the abnormality detection circuit 7. The abnormality detection circuit 7 detects, based on an output from the fixing thermistor 483, whether or not the fixing roller 481 has an abnormally heated temperature, namely, is in an abnormally heated state. It is noted that the abnormally heated temperature is set to, for example, a temperature that is higher than a fixing temperature by 25° C. to 100° C. inclusive. The abnormality detection circuit 7 includes a comparator 71 and a switching element 72.

In the comparator 71, a non-inverting input portion is connected to the fixing thermistor 483, and an inverting input portion is connected to a reference voltage generating portion (not shown). An output portion of the comparator 71 is connected to the input port 63 of the engine CPU 6 and to the switching element 72. The comparator 71 compares a voltage output from the fixing thermistor 483 with a reference voltage, and outputs a determination signal based on the comparison result. Here, the reference voltage is set to, for example, a voltage that is output from the fixing thermistor 483 when the fixing roller 481 has the abnormally heated temperature. As a result, for example, when a voltage output from the fixing thermistor 483 is lower than the reference voltage, the comparator 71 outputs the low-level signal indicating that the temperature of the fixing roller 481 is normal. On the other hand, when a voltage output from the fixing thermistor 483 is equal to or higher than the reference voltage, the comparator 71 outputs the high-level signal indicating that the fixing roller 481 has the abnormally heated temperature. The determination signal is input to the input port 63 of the engine CPU 6 and to the base of the switching element 72.

The switching element 72 is an NPN-type transistor. In the switching element 72, the base is connected to the output portion of the comparator 71, the collector is connected to a signal line that transmits the control signal from the engine CPU 6 to the fixing heater driving circuit 5, and the emitter is grounded. That is, when the switching element 72 is in the off-state, it connects the output port 62 of the engine CPU 6 to the fixing heater driving circuit 5, and when the switching element 72 is in the on-state, it makes the output port 62 of the engine CPU 6 grounded. In a normal state, the switching element 72 is in the off-state to connect the output port 62 of the engine CPU 6 to the fixing heater driving circuit 5, and with an input of the high-level signal from the comparator 71 to the base, the switching element 72 is switched from the off-state to the on-state. In addition, when the switching element 72 is in the on-state, with an input of the low-level signal from the comparator 71 to the base, the switching element 72 is switched from the on-state to the off-state.

In the abnormality detection circuit 7 of the above-described configuration, the comparator 71 makes a comparison between a voltage output from the fixing thermistor 483 and the reference voltage, and outputs a determination signal indicating whether or not the fixing roller 481 is in the abnormally heated state. When the high-level signal is input from the comparator 71 to the base of the switching element 72, the switching element 72 switches to the on-state. This allows the emitter and the collector of the switching element 72 to be conductive with each other, and the output port 62 of the engine CPU 6 is grounded. As a result, the ON signal (high-level signal) is not input to the fixing heater driving circuit 5 as the control signal. That is, a state that is similar to a state where the OFF signal (low-level signal) of the zero level is input to the fixing heater driving circuit 5, is maintained, and the fixing heater 482 is forcibly stopped. In this way, in the image forming apparatus 10, the fixing roller 481 is forcibly stopped by the abnormality detection circuit 7 that is different from the engine CPU 6. As a result, even if the fixing roller 481 is in the abnormally heated state due to an abnormality such as a runaway of the engine CPU 6, it is possible to reduce the temperature of the fixing roller 481 appropriately.

As shown in FIG. 3, the engine CPU 6 further includes an input-portion abnormality determining portion 64, an error-handling-process executing portion 65, and a power supply control portion 66.

When the abnormality detection circuit 7 has detected that the fixing roller 481 has the abnormally heated temperature, the input-portion abnormality determining portion 64 determines whether or not a first temperature calculated as the temperature of the fixing roller 481 is lower than a predetermined second temperature. When it determines that the first temperature is lower than the second temperature, the input-portion abnormality determining portion 64 determines that the A/D converter 61 is abnormal. The second temperature is set to be equal to or lower than the control target temperature that is the fixing temperature to be achieved in the fixing roller 481, and the second temperature is preferably the control target temperature.

When the abnormality detection circuit 7 has detected that the fixing roller 481 has the abnormally heated temperature and the input-portion abnormality determining portion 64 has determined that the first temperature is lower than the second temperature, the error-handling-process executing portion 65 executes a first error handling process that corresponds to an abnormality of the A/D converter 61. In addition, when the input-portion abnormality determining portion 64 has determined that the first temperature is equal to or higher than the second temperature, the error-handling-process executing portion 65 executes a second error handling process that is different from the first error handling process.

Here, the first error handling process includes, for example, stopping the operation of the image forming portion 4, restricting the operation/display portion 2 from accepting user operations, displaying an error message on the operation/display portion 2, and setting a first error control mode to indicate that the first error handling process is being executed. In the first error control mode, in a case where the main power source is turned off during execution of the first error handling process and then turned on again, the error-handling-process executing portion 65 does not execute the first error handling process. That is, in the image forming apparatus 10, in a case where a normal execution of the image forming process becomes available by turning off and on the main power supply, the execution of the image forming process is made available.

On the other hand, the second error handling process includes, for example, stopping the operation of the image forming portion 4, restricting the operation/display portion 2 from accepting user operations, displaying an error message on the operation/display portion 2, and setting a second error control mode to indicate that the second error handling process is being executed. In the second error control mode, in a case where the main power source is turned off during execution of the second error handling process, the error-handling-process executing portion 65 executes the second error handling process. It is noted that the error message displayed on the operation/display portion 2 in the second error handling process is that, for example, the fixing heater driving circuit 5 is abnormal, and the fixing heater driving circuit 5 needs maintenance. That is, in the image forming apparatus 10, in a case where a normal execution of the image forming process does not become available by turning off and on the main power supply, the execution of the image forming process is prohibited.

The power supply control portion 66 controls the stop and start of power supply to the engine CPU 6 by controlling a switch 91 provided in a power supply path from the power source portion 9 to the engine CPU 6.

[Fixing Heater Control Process]

Figure 5:
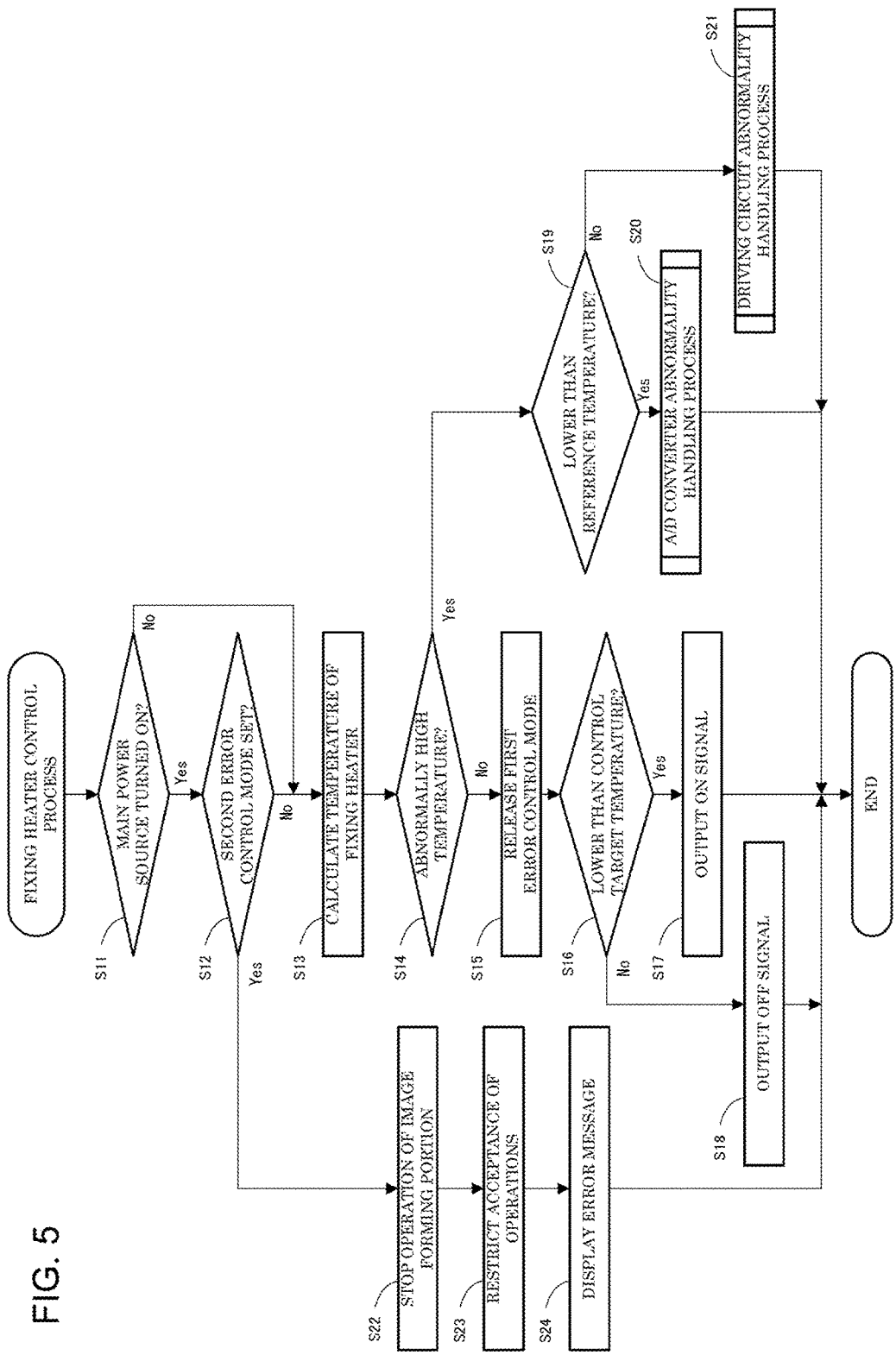
FIG. 5 is a flowchart showing an example of a fixing heater control process executed by the engine CPU shown in FIG. 3.
Figure 6:
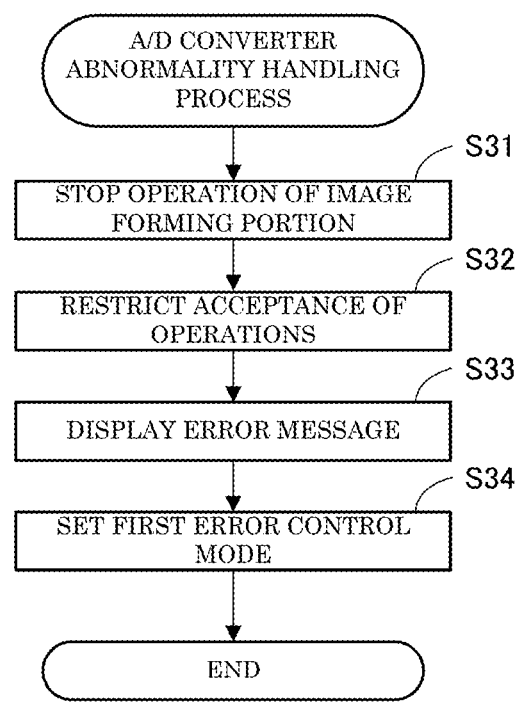
FIG. 6 is a flowchart showing an example of an A/D converter abnormality handling process in the fixing heater control process shown in FIG. 5.
Figure 7:
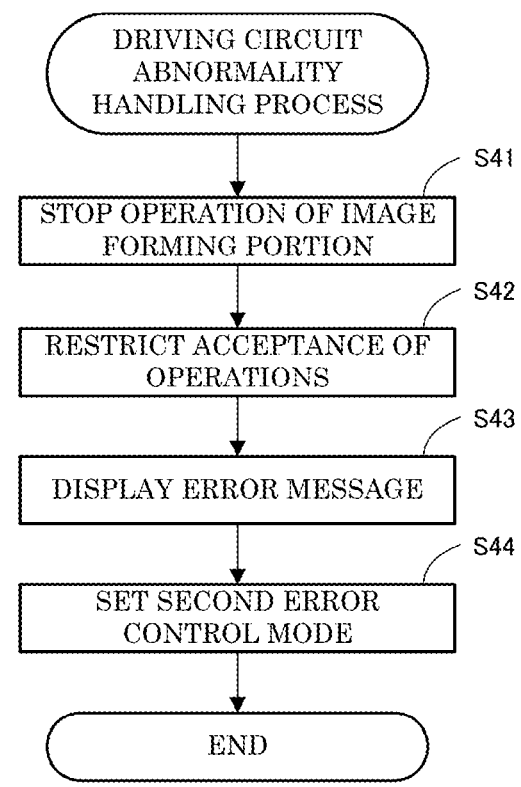
FIG. 7 is a flowchart showing an example of a driving circuit abnormality handling process in the fixing heater control process shown in FIG. 5.

The following describes, with reference to flowcharts of FIG. 5 to FIG. 7, an example of the procedure of a fixing heater control process that is executed by the input-portion abnormality determining portion 64 and the error-handling-process executing portion 65 of the engine CPU 6. Here, S11, S12 and the like in the drawings represent numbers assigned to the processing procedures (steps).

<Step S11>

As shown in FIG. 5, in step S11, the engine CPU 6 determines whether or not the user has turned on the main power source.

Here, upon determining that the user has turned on the main power source (step S11: Yes), the engine CPU 6 moves the process to step S12. On the other hand, upon determining that the user has not turned on the main power source (step S11: No), the engine CPU 6 moves the process to step S13.

<Step S12>

In step S12, the engine CPU 6 determines whether or not the second error control mode has been set. The second error control mode is set in step S44 (see FIG. 7) of a driving circuit abnormality handling process that is described below. The second error control mode indicates that an error handling process is being executed, based on a determination result of the engine CPU 6 that the fixing heater driving circuit 5 is abnormal (step S19: No). It is noted that the error handling process is described in detail below.

Here, upon determining that the second error control mode has been set (step S12: Yes), the engine CPU 6 moves the process to step S22. On the other hand, upon determining that the second error control mode has not been set (step S12: No), the engine CPU 6 moves the process to step S13.

<Step S13>

In step S13, the engine CPU 6 calculates the temperature of the fixing heater 482 based on the analog data that is input via the multiplexer 612. The temperature of the fixing heater 482 is repeatedly calculated in synchronization with the temperature monitoring timing. With regard to the temperatures calculated in step S13, at least the latest calculated temperature is stored in, for example, the RAM of the engine control portion 40. It is noted that the temperature calculated in step S13 as the temperature of the fixing heater 482 corresponds to the first temperature of the present disclosure.

Here, in step S13, even in a case where an error has occurred to the switching between the input channels of the multiplexer 612 and the first input channel has not been selected, the temperature of the fixing roller 481 is calculated in synchronization with the temperature monitoring timing. That is, in a case where an error has occurred to the switching between the input channels of the multiplexer 612, in step S13, the temperature of the fixing roller 481 may be calculated based on analog data from an input channel that is different from the first input channel. In that case, the temperature calculated as the temperature of the fixing heater 482 is different from the actual temperature of the fixing heater 482. For example, when the input channel of the multiplexer 612 is fixed to the second input channel, the temperature calculated in step S13 becomes an ambient temperature, and is calculated as a temperature that is extremely lower than the actual temperature of the fixing heater 482.

<Step S14>

In step S14, the engine CPU 6 determines whether or not the temperature of the fixing heater 482 is the abnormally heated temperature based on the determination signal from the abnormality detection circuit 7.

Here, upon determining that the temperature of the fixing heater 482 is not the abnormally heated temperature (step S14: No), the engine CPU 6 moves the process to step S15. On the other hand, upon determining that the temperature of the fixing heater 482 is the abnormally heated temperature (step S14: Yes), the engine CPU 6 moves the process to step S19.

It is noted that in a state where the temperature of the fixing heater 482 exceeds the abnormally heated temperature, the high-level signal (ON signal) is continuously transmitted from the comparator 71 to the switching element 72, and the on-state of the switching element 72 is maintained. While the switching element 72 is in the on-state, no control signal is transmitted to the fixing heater driving circuit 5, and the off-state of the fixing heater 482 is maintained.

<Step S15>

In step S15, the engine CPU 6 releases the first error control mode. The first error control mode is set in step S34 of an A/D converter abnormality handling process that is described below. The first error control mode indicates that an error handling process is being executed, based on a determination result of the engine CPU 6 that the A/D converter 61 is abnormal (step S19: Yes). That is, in a case where the engine CPU 6 determines that the temperature of the fixing heater 482 is not the abnormally heated temperature (step S14: No), the engine CPU 6 determines that the A/D converter 61 is not abnormal, and thus when an error handling process is executed to handle an abnormality of the A/D converter 61, the engine CPU 6 ends the error handling process.

<Steps S16 to S18>

In step S16, the engine CPU 6 determines whether or not the temperature calculated in step S13 is lower than the control target temperature. It is noted that the control target temperature corresponds to the fixing temperature that is to be achieved in the fixing roller 481.

Here, upon determining that the temperature of the fixing roller 481 is lower than the control target temperature (step S16: Yes), the engine CPU 6 outputs the ON signal to the fixing heater driving circuit 5 (step S17). This allows the fixing heater 482 to be driven to increase the temperature of the fixing roller 481. On the other hand, upon determining that the temperature of the fixing roller 481 is equal to or higher than the control target temperature (step S16: No), the engine CPU 6 outputs the OFF signal to the fixing heater driving circuit 5 (step S18). This allows the driving of the fixing heater 482 to be stopped to decrease the temperature of the fixing roller 481.

<Step S19>

In step S19, the engine CPU 6 determines whether or not the temperature calculated in step S13 is lower than the reference temperature. Upon determining that the temperature calculated in step S13 is lower than the reference temperature (step S19: Yes), the engine CPU 6 moves the process to step S20. On the other hand, upon determining that the temperature calculated in step S13 is equal to or higher than the reference temperature (step S19: No), the engine CPU 6 moves the process to step S21.

It is noted that the reference temperature is set to a temperature that is lower than the abnormally heated temperature, and is set to a temperature that is equal to or lower than the control target temperature of step S16. However, from the viewpoint of reducing the load on the fixing heater control process, the reference temperature is preferably the same as the control target temperature. The reference temperature is an example of the second temperature of the present disclosure.

<Step S20>

In step S20, the engine CPU 6 determines that the A/D converter 61 is abnormal, and executes the A/D converter abnormality handling process. As shown in FIG. 6, the engine CPU 6 stops the operation of the image forming portion 4 (step S31), restricts the operation/display portion 2 from accepting user operations (step S32), and displays an error message on the operation/display portion 2 (step S33). The processes of steps S31 to S33 are an example of the first error handling process of the present disclosure.

As the stopping of the operation of the image forming portion 4 executed in step S31, for example, the power supply control portion 66 stops the power supply to the image forming portion 4 by switching the switch 91 to the off-state, and the engine CPU 6 transmits a driving stop signal to components of the image forming portion 4.

As the restriction on the operation/display portion 2 accepting user operations, for example, when a user operation is performed on the operation/display portion 2, a control is made to disregard the user operation.

The error message is displayed on the operation/display portion 2 to notify the user that an error has occurred due to an abnormality of the engine CPU 6. The error message, for example, indicates that an error has occurred in the engine CPU 6, and urges the user to turn on the main power source again. In addition, the error message may notify that the image forming operation has stopped, or the error message may be an error code corresponding to the abnormality of the engine CPU 6.

Subsequently, the engine CPU 6 sets the first error control mode (step S34). The first error control mode indicates that the error handling process of steps S31 to S33 is being executed. The setting of the first error control mode is executed by, for example, setting a flag on a register. The setting of the first error control mode is an example of the first error handling process of the present disclosure.

It is noted that the error handling process of steps S31 to S34 differs from the error handling process of steps S41 to S44 at least in part of the driving circuit abnormality handling process that is described below. Specifically, in the present embodiment, the error handling process of step S33 differs from the error handling process of step S43 in that the error message of step S33 indicates that an error has occurred in the engine CPU 6, and urges the user to turn on the main power source again. In addition, in the present embodiment, the error handling process of step S34 differs from the error handling process of step S44 in that in step S34, the first error control mode is set, and the error handling process is regarded not to have been continued after the power source was turned on again.

<Step S21>

As shown in FIG. 5, in step S21, the engine CPU 6 executes the driving circuit abnormality handling process. As shown in FIG. 7, the engine CPU 6 executes an error handling process that is the same as the A/D converter abnormality handling process shown in FIG. 6. That is, the engine CPU 6 stops the operation of the image forming portion 4 (step S41), restricts the operation/display portion 2 from accepting user operations (step S42), and displays an error message on the operation/display portion 2 (step S43). The error message displayed on the operation/display portion 2 indicates, for example, that an abnormality has occurred in the fixing heater driving circuit 5, and the fixing heater driving circuit 5 needs maintenance. In addition, the error message may notify that the image forming operation has stopped, or the error message may be an error code corresponding to the abnormality of the fixing heater driving circuit 5. The processes of steps S41 to S43 are an example of the second error handling process of the present disclosure.

Subsequently, the engine CPU 6 sets the second error control mode (step S44). The second error control mode indicates that the error handling process of steps S41 to S43 is being executed. The setting of the second error control mode is executed by, for example, setting a flag on a register. The setting of the second error control mode is an example of the second error handling process of the present disclosure.

<Steps S22 to S24>

As shown in FIG. 5, the engine CPU 6 executes steps S22 to S24 as the error handling process. Specifically, the engine CPU 6 stops the operation of the image forming portion 4 (step S22), restricts the operation/display portion 2 from accepting user operations (step S23), and displays an error message on the operation/display portion 2 (step S24). That is, upon determining that the second error control mode has been set (step S12: Yes), the engine CPU 6 executes the error handling process (steps S41 to S43) in the driving circuit abnormality handling process of step S21, even after the main power source is turned on again. It is noted that the error handling process (steps S31 to S33) in the A/D converter abnormality handling process of step S20 is not executed after the main power source is turned on again, and is released when the main power source is turned off.

As described above, in the image forming apparatus 10, in a case where the abnormality detection circuit 7 detects that the fixing roller has the abnormally heated temperature, when the engine CPU 6 determines that the temperature of the fixing heater 482 is lower than the reference temperature, it is determined that the A/D converter 61 of the engine CPU 6 is abnormal.

Here, among causes of the abnormally heated temperature of the fixing roller 481, some causes can be eliminated easily by turning off and on the main power source, and some causes cannot be eliminated easily and need a repair by a service engineer. An example of a cause that cannot be eliminated easily, is an abnormality of the fixing heater driving circuit 5. On the other hand, an example of a cause that can be eliminated easily, is a latchup between input channels of the A/D converter 61 of the engine CPU 6. The latchup may be solved by turning off the main power source.

In many cases, the latchup can be solved by turning off the main power source a plurality of times.

On the other hand, in the image forming apparatus 10, it is possible to determine whether or not the A/D converter 61 of the engine CPU 6 is abnormal. As a result, when the fixing roller 481 is in the abnormally heated state, it is possible to determine whether or not there is a possibility that the abnormally heated state can be solved easily by turning off and on (turning on again) the main power source. With this configuration, in the image forming apparatus 10, when there is a possibility that the abnormally heated state can be solved easily, a repair by a service engineer is not required, and the time is not wasted identifying the cause of the abnormality. As a result, in the image forming apparatus 10, in a case where the cause of an abnormal heating of the fixing roller 481 is an abnormality of the A/D converter 61, a state where the image forming process cannot be executed due to a repair by a service engineer or the like is avoided, and the convenience of the user is improved.

In addition, in the image forming apparatus 10, the engine CPU 6 distinguishes between an abnormality of the A/D converter 61 and an abnormality of the fixing heater driving circuit 5, and executes different error handling processes upon detection of their abnormalities. Furthermore, the error handling process for the abnormality of the A/D converter 61 (first error control mode) can be released by turning on the main power source again. On the other hand, release of the error handling process for the abnormality of the fixing heater driving circuit 5 (second error control mode) is restricted even if the main power source is turned on again. That is, in the image forming apparatus 10, with respect to an abnormality that can be easily solved by turning on the main power source again, it is made possible to release the error handling process, and with respect to an abnormality that cannot be solved easily, release of the error handling process is restricted. With this configuration, in a case where there is a possibility that a serious abnormality has occurred, the image forming process continues to be stopped, and in a case where an abnormality that can be easily solved has occurred, a resumption of the image forming process is made possible. Accordingly, in the image forming apparatus 10, it is possible to avoid a state where the image forming process cannot be executed more than necessary, and the convenience of the user is improved.

In addition, it is possible to determine whether or not the A/D converter 61 is abnormal only by determining whether or not the temperature of the fixing heater 482 is lower than the reference temperature after the abnormality detection circuit 7 detects that the fixing roller has the abnormally heated temperature. Accordingly, in the image forming apparatus 10, the cause of the abnormality is determined by a simple process, and it is possible to transfer to the error handling process in a short time. As a result, it is possible to restrict a wasteful printing from being continued while an abnormality is determined to execute an error handling process. This reduces an economic loss due to wastefully formed defective printed matter.

[Second Embodiment]

Figure 8:
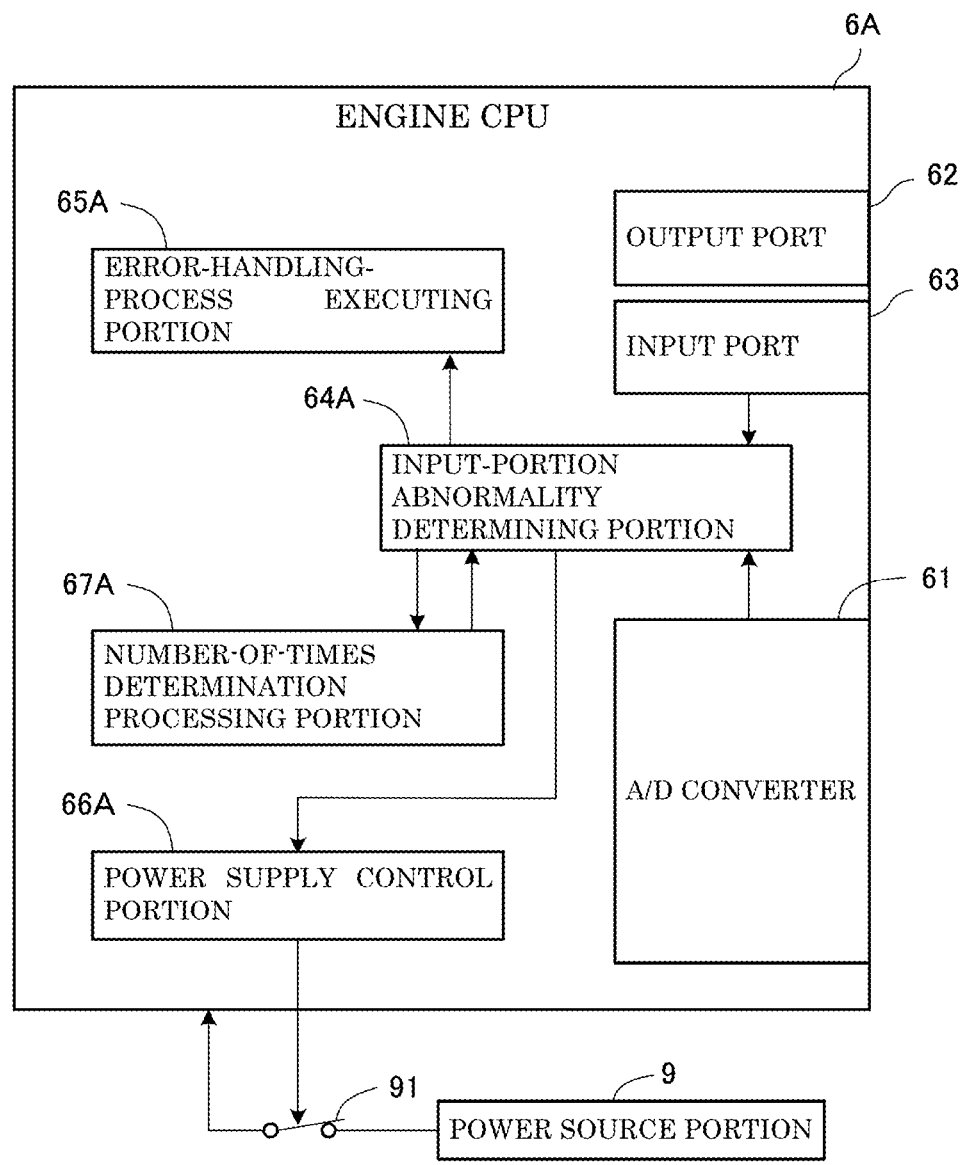
FIG. 8 is a block diagram showing an engine CPU of an image forming apparatus according to a second embodiment of the present disclosure.
Figure 9:
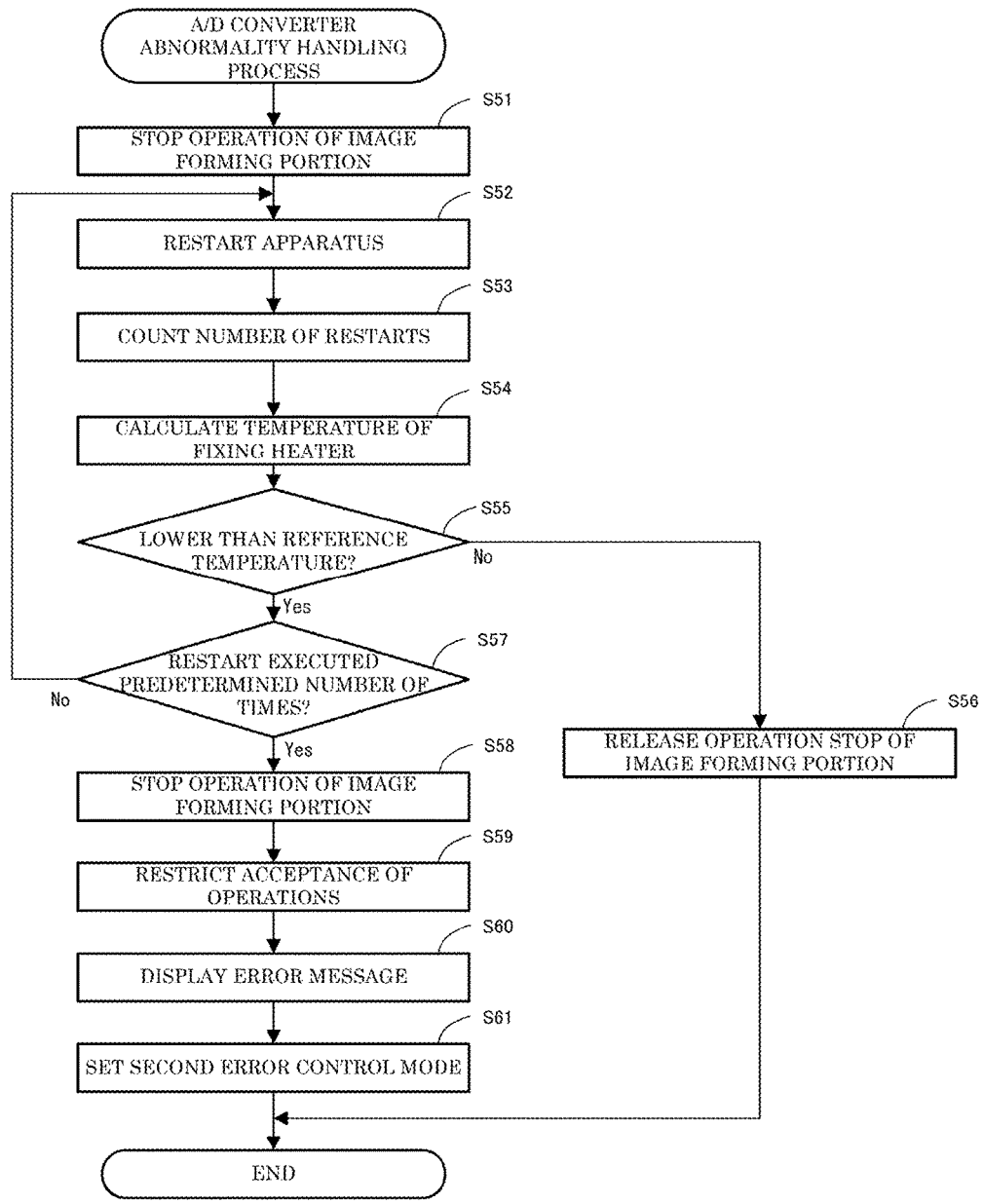
FIG. 9 is a flowchart showing another example of the A/D converter abnormality handling process in the fixing heater control process executed by the engine CPU shown in FIG. 8.

Next, a description is given of an image forming apparatus according to a second embodiment of the present disclosure, with reference to FIG. 8 and FIG. 9. The image forming apparatus according to the second embodiment of the present disclosure is the same as that of the first embodiment in the basic configuration, except for the configuration of the engine CPU (an example of the calculation processing portion of the present disclosure).

An engine CPU 6A shown in FIG. 8 includes the A/D converter 61, the output port 62, the input port 63, a power supply control portion 66A, an input-portion abnormality determining portion 64A, an error-handling-process executing portion 65A, and a number-of-times determination processing portion 67A. It is noted that a description of the A/D converter 61, the output port 62, and the input port 63 is omitted since they are the same as those described in the first embodiment.

The power supply control portion 66A controls a stop and a start of a power supply to the engine CPU 6A by controlling the switch 91 provided in a power supply path from the power source portion 9 to the engine CPU 6A. For example, in a case where the input-portion abnormality determining portion 64A has determined that the A/D converter 61 is abnormal, the power supply control portion 66A stops the power supply to the engine CPU 6A by switching the switch 91 to the off-state, and then resumes the power supply to the engine CPU 6A by switching the switch 91 to the on-state. That is, the power supply control portion 66A restarts the engine CPU 6A in a case where the input-portion abnormality determining portion 64A determines that the A/D converter 61 is abnormal.

The input-portion abnormality determining portion 64A determines whether or not the first temperature is lower than the second temperature after the power supply control portion 66A stops and resumes the power supply to the engine CPU 6A.

When the input-portion abnormality determining portion 64A has determined that the A/D converter 61 is abnormal, the number-of-times determination processing portion 67A determines whether or not the number of times that the power supply control portion 66A stopped and resumed the power supply to the engine CPU 6A is equal to a predetermined reference number of times.

The error-handling-process executing portion 65A executes an error handling process when the number-of-times determination processing portion 67A has determined that the number of times that the power supply control portion 66A stopped and resumed the power supply to the engine CPU 6A is equal to the reference number of times.

Next, with reference to FIG. 9, a description is given of another example of the A/D converter abnormality handling process in the fixing heater control process executed by the input-portion abnormality determining portion 64A, the error-handling-process executing portion 65A, the power supply control portion 66A, and the number-of-times determination processing portion 67A of the engine CPU 6A.

<Steps S51 to S53>

As shown in FIG. 9, the engine CPU 6 stops the operation of the image forming portion 4 (step S51), and then restarts the image forming apparatus 10 (step S52). At this time, in a case where the input-portion abnormality determining portion 64A has determined that the A/D converter 61 is abnormal, the power supply control portion 66A stops the power supply to the engine CPU 6A by switching the switch 91 to the off-state, and then resumes the power supply to the engine CPU 6A by switching the switch 91 to the on-state. Subsequently, the engine CPU 6A counts the number of restarts since the engine CPU 6 determined that the temperature was lower than the reference temperature in step S19 of FIG. 5 (step S53).

<Step S54>

In step S54, the engine CPU 6A repeatedly calculates the temperature of the fixing heater 482 in synchronization with the temperature monitoring timing. With regard to the temperatures calculated in step S54, at least the latest calculated temperature is stored in the RAM of the engine control portion 40 or the like.

<Step S55>

In step S55, the engine CPU 6A determines whether or not the temperature calculated in step S54 is lower than the reference temperature. That is, the engine CPU 6A determines whether or not the abnormality of the A/D converter 61 has been solved by the restart in step S52.

Here, upon determining that the temperature calculated in step S54 is lower than the reference temperature (step S55: Yes), the engine CPU 6A moves the process to step S57. On the other hand, upon determining that the temperature calculated in step S54 is equal to or higher than the reference temperature (step S55: No), the engine CPU 6A moves the process to step S56.

<Step S56>

In step S56, the engine CPU 6A releases the stop of the operation of the image forming portion 4, and ends the A/D converter abnormality handling process. That is, since it has been determined in step S55 that the temperature calculated in step S54 is equal to or higher than the reference temperature, the engine CPU 6A determines that the abnormality of the A/D converter 61 has been solved by the restart in step S52. This makes it possible for the image forming portion 4 to execute the image forming process.

<Step S57>

In step S57, the engine CPU 6A determines whether or not the restart of the image forming apparatus 10 has been executed a predetermined number of times. For example, the predetermined number of times is selected from a range from 1 (once) to 5 (five times), and is preferably set to 2 (twice) or 3 (three times).

Here, upon determining that the restart of the image forming apparatus 10 has been executed the predetermined number of times (step S57: Yes), the engine CPU 6A moves the process to step 58. On the other hand, upon determining that the restart of the image forming apparatus 10 has not been executed the predetermined number of times (step S57: No), the engine CPU 6A moves the process to step 52.

<Steps S58 to S60>

Upon determining that the restart of the image forming apparatus 10 has been executed the predetermined number of times (step S57: Yes), the engine CPU 6A determines that the abnormality of the A/D converter 61 is not solved, and executes the error handling process in steps S58 to S60. Specifically, the engine CPU 6A stops the operation of the image forming portion 4 (step S58), restricts the operation/display portion 2 from accepting user operations (step S59), and displays an error message on the operation/display portion 2 (step S60).

<Step S61>

In step S61, the engine CPU 6A sets the second error control mode. In the second error control mode, the error handling process is not released even when the user turns on the main power source again (see FIG. 5). In other words, in a case where the abnormality of the A/D converter 61 is not solved even if the restart of the image forming apparatus 10 is executed the predetermined number of times, the engine CPU 6A, when the main power source is turned on again by the user, stops the operation of the image forming portion 4, restricts the operation/display portion 2 from accepting user operations, and displays an error message on the operation/display portion 2 (steps S22 to S24 of FIG. 5).

As described above, in the image forming apparatus 10, it is determined whether or not the abnormality of the A/D converter 61 is solved after restarting the image forming apparatus 10 by turning off and on the main power source a predetermined number of times. As a result, in the image forming apparatus 10, in a case where an abnormality that may be easily solved occurs in the A/D converter 61, it is determined whether or not the abnormality is solved by a simple operation of restarting the image forming apparatus 10. In case of an abnormality that may be easily solved, after the abnormality is solved, execution of the image forming operation by the image forming portion 4 is made available. As a result, in the image forming apparatus 10, it is possible to avoid a state where the image forming process cannot be executed more than necessary due to a repair by a service engineer, and the convenience of the user is improved. On the other hand, with respect to an abnormality that cannot be solved easily, releasing the error handling process is restricted by setting the second error control mode. With this configuration, in a case where a serious abnormality has occurred in the A/D converter 61, execution of the image forming process is restricted, the abnormality of the A/D converter 61 is restricted from becoming more serious, and a failure such as a seizure of the fixing roller 481 is restricted.

It is noted that in step S52 of the A/D converter abnormality handling process shown in FIG. 9, instead of the image forming apparatus 10, the engine control portion 40 may be restarted. That is, in step S52, portions other than the engine CPU 6A may not be restarted, but the power supply to the engine CPU 6A may be stopped and resumed. In this case, in step S53, the number of restarts of the fixing device 6A is counted, and in step S57, it is determined whether or not the engine CPU 6A has been restarted a predetermined number of times.

In step S21 of the fixing heater control process, instead of the driving circuit abnormality handling process, the A/D converter abnormality handling process and an abnormality handling process other than the driving circuit abnormality handling process may be executed. Also, in the step S21, in addition to the driving circuit abnormality handling process, the other abnormality handling process may be executed.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus comprising:
   a fixing member configured to fix a toner image to a sheet;
   a fixing heater configured to heat the fixing member;
   a temperature detection portion configured to detect a temperature of the fixing member;
   a driving circuit configured to drive the fixing heater based on the temperature detected by the temperature detection portion;
   an abnormality detection circuit connected to the temperature detection portion and configured to detect whether or not the temperature detected by the temperature detection portion is in an abnormally heated temperature range; and
   a calculation processing portion including:
     an input portion connected to the temperature detection portion;
     an input-portion abnormality determining portion configured to, when the abnormality detection circuit has detected that the temperature detected by the temperature detection portion is in the abnormally heated temperature range, determine whether or not a first temperature calculated as the temperature of the fixing member is lower than a predetermined second temperature, and upon determining that the first temperature is lower than the second temperature, determine that the input portion is abnormal;

a power supply control portion configured to, in a case where the input-portion abnormality determining portion has determined that the input portion is abnormal, stop a power supply to the calculation processing portion and then resume the power supply to the calculation processing portion;

a number-of-times determination processing portion configured to, when the input-portion abnormality determining portion has determined that the input portion is abnormal, determine whether or not a number of times that the power supply control portion stopped and resumed the power supply to the calculation processing portion is equal to a predetermined reference number of times; and an error-handling-process executing portion configured to execute an error handling process when the number-of-times determination processing portion has determined that the number of times that the power supply control portion stopped and resumed the power supply to the calculation processing portion is equal to the reference number of times, wherein the input-portion abnormality determining portion determines whether or not the first temperature is lower than the second temperature, after the power supply control portion stops and resumes the power supply to the calculation processing portion.

2. The image forming apparatus according to claim 1, wherein the calculation processing portion further includes:
an error-handling-process executing portion configured to, when the abnormality detection circuit has detected that the temperature detected by the temperature detection portion is in the abnormally heated temperature range, and the input-portion abnormality determining portion has determined that the first temperature is lower than the second temperature, execute a first error handling process that corresponds to an abnormality of the input portion, and when the input-portion abnormality determining portion has determined that the first temperature is equal to or higher than the second temperature, execute a second error handling process that is different from the first error handling process.

3. An image forming apparatus comprising:
a fixing member configured to fix a toner image to a sheet;
a fixing heater configured to heat the fixing member;
a temperature detection portion configured to detect a temperature of the fixing member;
a driving circuit configured to drive the fixing heater based on the temperature detected by the temperature detection portion;
an abnormality detection circuit connected to the temperature detection portion and configured to detect whether or not the temperature detected by the temperature detection portion is in an abnormally heated temperature range; and
a calculation processing portion including:
an input portion connected to the temperature detection portion;
an input-portion abnormality determining portion configured to, when the abnormality detection circuit has detected that the temperature detected by the temperature detection portion is in the abnormally heated temperature range, determine whether or not a first temperature calculated as the temperature of the fixing member is lower than a predetermined second temperature, and upon determining that the first temperature is lower than the second temperature, determine that the input portion is abnormal; and
an error-handling-process executing portion configured to, when the abnormality detection circuit has detected that the temperature detected by the temperature detection portion is in the abnormally heated temperature range, and the input-portion abnormality determining portion has determined that the first temperature is lower than the second temperature, execute a first error handling process that corresponds to an abnormality of the input portion, and when the input-portion abnormality determining portion has determined that the first temperature is equal to or higher than the second temperature, execute a second error handling process that is different from the first error handling process, wherein
in a case where a main power source is turned off during execution of the first error handling process and then turned on again, the error-handling-process executing portion does not execute the first error handling process, and in a case where the main power source is turned off during execution of the second error handling process, the error-handling-process executing portion executes the second error handling process.

4. The image forming apparatus according to claim 1, wherein the abnormality detection circuit includes:
a switching element connected to a signal line that transmits a control signal from the calculation processing portion to the driving circuit, and configured to be switched between an on-state in which the control signal is transmitted to the driving circuit, and an off-state in which the control signal is not transmitted.

5. The image forming apparatus according to claim 4, wherein the abnormality detection circuit includes:
a comparator configured to make a comparison between a voltage output from the temperature detection portion and a predetermined reference voltage, and output a determination signal based on a result of the comparison,
the input-portion abnormality determining portion determines, based on the determination signal, whether or not the first temperature is lower than the second temperature, and
the switching element is switched between the on-state and the off-state based on the determination signal.

6. The image forming apparatus according to claim 1, wherein the calculation processing portion is a CPU, and
the input portion is an A/D converter that includes a multiplexer.

7. The image forming apparatus according to claim 6, wherein the multiplexer includes a first input channel and a second input channel, the first input channel being connected to the temperature detection portion, the second input channel being connected to an ambient-temperature detection portion configured to detect an ambient temperature.

8. The image forming apparatus according to claim 3, wherein
the abnormality detection circuit includes:
a switching element connected to a signal line that transmits a control signal from the calculation processing portion to the driving circuit, and configured to be switched between an on-state in which the control signal is transmitted to the driving circuit, and an off-state in which the control signal is not transmitted.

9. The image forming apparatus according to claim 8, wherein
the abnormality detection circuit includes:
a comparator configured to make a comparison between a voltage output from the temperature detection portion and a predetermined reference voltage, and output a determination signal based on a result of the comparison,
the input-portion abnormality determining portion determines, based on the determination signal, whether or not the first temperature is lower than the second temperature, and
the switching element is switched between the on-state and the off-state based on the determination signal.

10. The image forming apparatus according to claim 3, wherein
the calculation processing portion is a CPU, and
the input portion is an A/D converter that includes a multiplexer.

11. The image forming apparatus according to claim 10, wherein
the multiplexer includes a first input channel and a second input channel, the first input channel being connected to the temperature detection portion, the second input channel being connected to an ambient-temperature detection portion configured to detect an ambient temperature.

* * * * *